(12) United States Patent
Abel et al.

(10) Patent No.: US 10,239,574 B2
(45) Date of Patent: Mar. 26, 2019

(54) SCOOTER

(71) Applicant: Helmut Abel, Maison-Laffitte (FR)

(72) Inventors: Helmut Abel, Maison-Laffitte (FR);
Diane Abel, Maison-Laffitte (FR);
Céline Abel, Maison-Laffitte (FR)

(73) Assignee: Helmut Abel, Maison-Laffitte (FR)

( * ) Notice: Subject to any disclaimer, the term of this patent is extended or adjusted under 35 U.S.C. 154(b) by 0 days.

(21) Appl. No.: 15/942,888

(22) Filed: Apr. 2, 2018

(65) Prior Publication Data

US 2018/0281885 A1 Oct. 4, 2018

(30) Foreign Application Priority Data

Mar. 31, 2017 (DE) .................... 10 2017 107 035

(51) Int. Cl.
*B62K 3/00* (2006.01)
*B62J 25/00* (2006.01)
(52) U.S. Cl.
CPC ............... *B62K 3/002* (2013.01); *B62J 25/00* (2013.01)
(58) Field of Classification Search
None
See application file for complete search history.

(56) References Cited

U.S. PATENT DOCUMENTS

| | | | | |
|---|---|---|---|---|
| 3,574,969 A * | 4/1971 | Cleveland | ............... | A63H 3/50 280/87.041 |
| 4,828,284 A * | 5/1989 | Sandgren | ............... | B62K 3/002 280/221 |
| 6,467,560 B1 * | 10/2002 | Anderson | ............... | A63C 17/01 180/181 |
| 7,954,831 B1 * | 6/2011 | Yeh | ......... | B62K 3/002 16/429 |
| 10,124,851 B2 * | 11/2018 | Lovley, II | ............... | B62K 11/00 |
| 2009/0160150 A1 * | 6/2009 | Johnson | ................ | B62K 3/002 280/87.041 |
| 2011/0148061 A1 * | 6/2011 | Johnson | ................ | B62K 3/002 280/87.041 |
| 2014/0062046 A1 * | 3/2014 | Wilson | ................ | A63C 17/006 280/87.042 |
| 2015/0035257 A1 | 2/2015 | Zaid | | |

(Continued)

FOREIGN PATENT DOCUMENTS

| | | |
|---|---|---|
| EP | 2340986 | 7/2011 |
| WO | 2013128437 | 9/2013 |

OTHER PUBLICATIONS

German Patent Office, "Office Action," issued in German Patent Application No. DE 10 2017 107 035.4, dated Aug. 3, 2017, document of 5 pages.

(Continued)

*Primary Examiner* — Paul N Dickson
*Assistant Examiner* — Hilary L Johns
(74) *Attorney, Agent, or Firm* — Akerman LLP; Peter A. Chiabotti

(57) ABSTRACT

The application relates to a scooter with a very short, compact footboard, the front width of which corresponds to the width of two feet placed side by side on the footboard and the length of the foot plate of which corresponds to the length of the rider's feet. At its front end, the footboard has laterally projecting wings as footrests that are symmetrical to the steering column and the center line, respectively.

10 Claims, 4 Drawing Sheets

(56) References Cited

U.S. PATENT DOCUMENTS

2016/0114240 A1* 4/2016 Kim .................... A63C 5/12
                                                    280/609
2017/0029058 A1   2/2017 Allais

OTHER PUBLICATIONS

European Patent office, "Search Report," issued in European Patent Application No. 18162506.2, dated Aug. 30, 2018, document of 8 pages.

* cited by examiner

SCOOTER

CROSS REFERENCE TO RELATED APPLICATIONS

This application claims priority and incorporates by reference German Patent Application No. 10 2017 107 035.4, filed Mar. 31, 2017.

BACKGROUND

The application relates to a scooter.

Scooters, in general, are known for centuries and described in many publications in various versions. They are still used today by children and young people for playing purposes and increasingly also by adults in daily commute and even for commercial purposes.

Nevertheless, not too much has changed in their construction and, in particular, in how they are used.

When rolling along, i.e., riding without pushing, the rider with his supporting foot stands at the front of the footboard, while his pushing foot stands in a short resting position at the back of the narrow footboard, roughly in line behind his supporting foot.

In this position, in which the rider stands with both feet on the usually narrow footboard, he has only poor lateral stability. That is why he is forced to always hold on to, and also support himself by, the horizontal handlebar with both hands.

Another quite major disadvantage of the traditional scooter is the following.

Although in free-riding scooters the rider stands centrally with respect to the steering column, the rider tilts sideways during each pushing operation and gets into a laterally inclined position, especially as the foot plate of the footboards of typical scooters is relatively high due to its design. As a consequence, as a counter measure, at each pushing operation, the rider must support himself with his opposite hand on the handlebar. As a result, the steering of the scooter is unsteady and inaccurate, and the pushing is difficult. Furthermore, after each pushing operation the rider must move upwards from the inclined position, to then again stand centrally with respect to the steering column. For this reason, riding with the traditional scooters is quite tiring, especially for adults with a higher body weight, especially for longer distances.

SUMMARY

The present application is based on the object to change the construction of the scooter fundamentally in such a way that the disadvantages mentioned are avoided, so that the rider can ride the scooter comfortably and standing securely without any problems.

While the front width of the footboard should correspond to the width of two feet placed side by side on the footboard, the length of the foot plate of the footboard should correspond to the length of the rider's feet.

For this purpose, an average size of a foot must be assumed. It is also conceivable to provide footboards adapted to certain foot sizes or ranges of foot sizes.

This creates a short and compact scooter that, on the one hand, allows safe riding both when free rolling and when pushing and, on the other hand, because of its short length, it is easy to transport, e.g., in public transport.

According to another feature, laterally projecting wings that are symmetrical to the steering column are provided at the front end of the footboard which serve as footrests. Especially when pushing, the rider can rest his other foot on said wings so that the scooter differs from traditional scooters in that it gets less into an inclined position.

As suggested further, the wings should be angled upwards with respect to the central foot board area in such a manner so that they support the scooter when tilted in the park position, however, when cornering, do not contact the roadway when in an inclined position. In one arrangement, an angle of about 8° has hereby proven advantageous. Constructed with this construction concept there is no need to use the otherwise typical stands.

In order for the rider's pushing foot to be as close as possible to the center line of the footboard when pushing, the footboard, according to another feature, should taper backwards in the area adjoining the wings.

A further embodiment serves to further shorten the scooters, according to which the footboard in its front area has a semicircular slot which serves as a free space for the steering wheel that is rotatably mounted in a fork of the steering column.

With the same aim an another embodiment, the rear arear of the foot board can have a slot, in which the rear wheel which is rotatably mounted in a fork.

When implementing the measures proposed in this application, the dimensions set forth herein have proven to be particularly suitable.

A scooter with footboard widths of 250 mm at the front and 100 mm at the back can be used by riders with shoe sizes of up to shoe size 47 without problems. Therefore, there is no need to offer scooter of various sizes.

Due to the long design, the footboards of traditional scooters require a certain strength, or reinforcements arranged below the footboards in order to protect the long footboards against bending or breaking. Also, there must be sufficient distance between the bottom surface of the footboard and the roadway.

In an embodiment of the shorter footboards set forth herein, the above arrangement is not necessary, so that such footboards discussed herein can be made of thin-walled, preferably 8 mm thick duralumin. This allows for reducing the distance between the bottom of the footboard and the roadway, which results in an improved road holding due to the lower center of gravity.

BRIEF DESCRIPTION OF THE DRAWINGS

The subject of the application is explained in detail below with reference to exemplary embodiments. The scooters shown to scale in the drawings correspond to proven prototypes. In the drawings.

DETAILED DESCRIPTION

Figure 1:
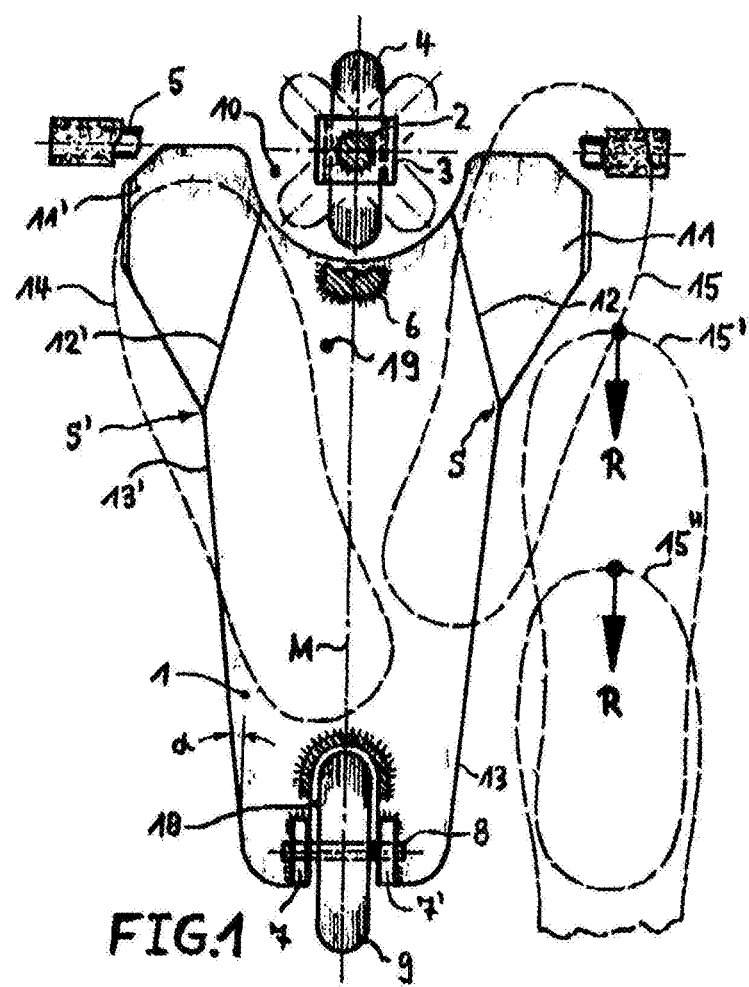
FIG. 1 shows a partially sectioned plan view of the scooter according to a first embodiment.

As shown in FIG. 1, a scooter can have a footboard 1, a usually vertical steering column 2 with a wheel fork 3, in which the front wheel 4 is mounted, a horizontal handlebar 5 (marked only partly) and a rear fork 7, 7', which carries the axle 8 of the rear wheel 9, which passes through a recess 18 of the running board 1. The bearing for the steering column 2 is connected to the footboard 1 with a strut 6. At the front end of the footboard 1, laterally projecting wings 11, 11' that are symmetrical to the steering column 2 and the center line M, respectively, are provided, which are bent upwards along the bending lines 12, 12' by approximately 8°. The bending lines 12, 12' intersect the lateral edges of the footboard 13, 13' at intersections S, S'. Up to the intersections S, S' the width of the footboard 1 corresponds to the width of two feet of the driver placed side by side on the food board 1 and which are indicated by contours 14, 15.

The length L of the foot plate 19 of the footboard 1, i.e. the useful area of the footboard 1, on which the rider stands, corresponds approximately to the length of the rider's feet.

Starting at intersections S, S', the footboard 1 tapers backwards on both sides by the angle α, which is 6° in this design. This creates a free space on both sides of the rear end of the footboard 1 for the rider's pushing foot, which is indicated in its various positions with the dashed contours 15, 15', 15" and the pushing direction R.

The measures as set forth herein allow the construction of a small, very short and compact scooter suitable for riders of all ages and even for tall, heavyweight riders.

A particularly short design arises when, as shown in the exemplary embodiment according to FIG. 1, the footboard 1 in its front area has a semicircular slot 10 for the front wheel 4. In this manner, an overall length of about 550 mm can be achieved. Since the footboard 1, which preferably consists of duralumin, is very thin, preferably 8 mm thick, the distance between the bottom surface of the footboard and the roadway is very short. It may be, e.g., only 30 mm.

Figure 2:
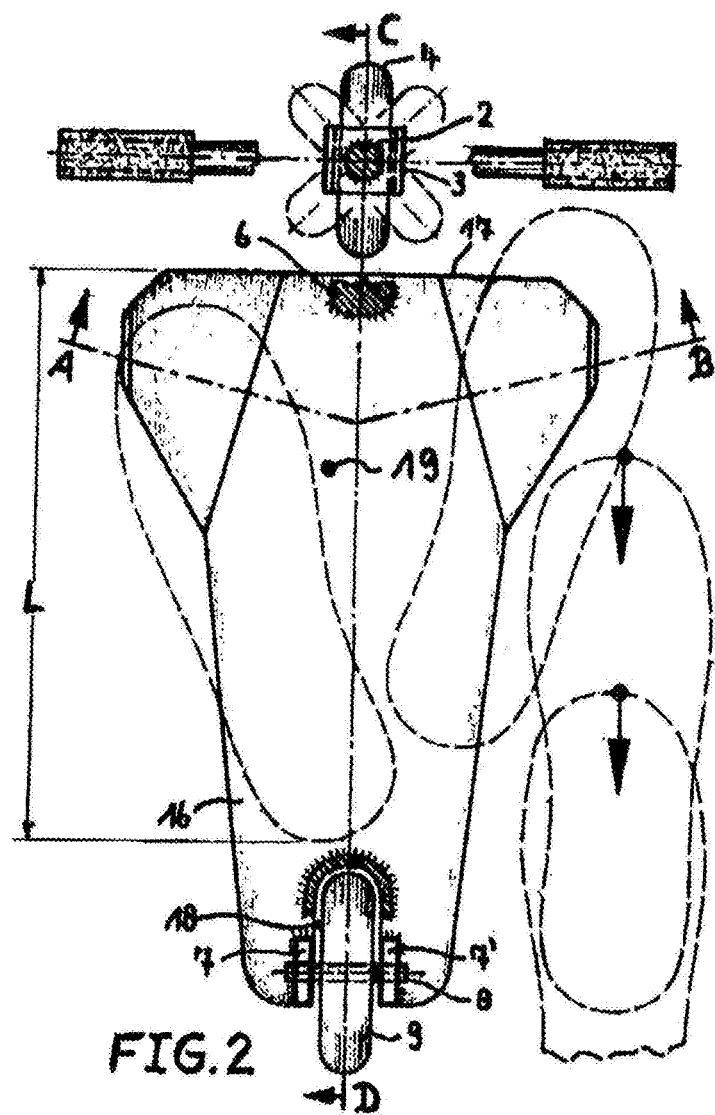
FIG. 2 shows a partially sectioned plan view of the scooter according to a second embodiment.
Figure 3:
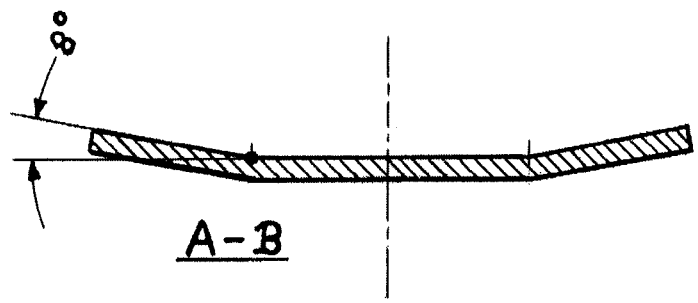
FIG. 3 shows a section along the line A-B in FIG. 2.
Figure 4:
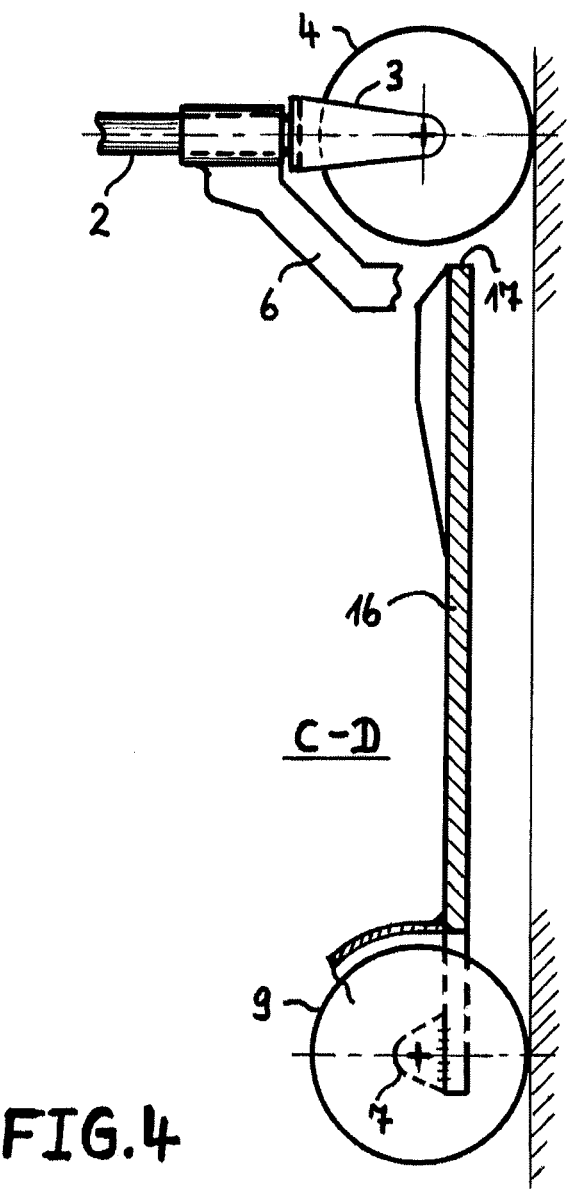
FIG. 4 shows a section along the line C-D in FIG. 2.

The scooter in the exemplary embodiment according to FIG. 2 is slightly longer, where slot 10 which is provided in the exemplary embodiment according to FIG. 1, is missing.

In other respects, this design corresponds to the exemplary embodiment according to FIG. 1.

The particular advantages that result when riding the scooter are explained in detail below.

As indicated in FIGS. 1 and 2, a rider, here a right-footed rider, stands with his supporting foot 14 on the left side of the footboard, wherein the heel area of the supporting foot 14 is located preferably close to the center line M of the footboard 1.

Initially, the pushing foot 15 is still on the footboard 1. From this position, the rider performs a pushing motion in direction R with his pushing foot 15, as arranged with pushing foot positions 15' and 15". Thereafter, the rider moves the pushing foot 15 back to the footboard edge 13 and the slightly upwardly bent wing 11. In this position, the supporting foot 14 and the pushing foot 15 of the rider are positioned about side by side, so the rider assumes a safe standing position, in which he stands centrally in front of the vertical steering column 2 when continuing his ride, so that he can steer the scooter accurately.

Owing to the rear tapering of the footboard 1, without significantly changing his position on the footboard, the rider can push by means of his pushing foot 15, as indicated by the dashed contours 15' and 15". Hence, contrary to usual scooters, the rider can move his pushing foot 15 laterally and directly in the pushing position 15', whereby the otherwise necessary energy-consuming movement of the pushing foot from back to front is completely eliminated.

Since the rider always stands centrally in front of the steering column 2, his lateral inclination during the pushing operation is completely avoided, also by the fact that the footboard surface should have only a very small distance to the roadway surface.

The construction according to the application allows the rider to always stand comfortably and securely on the footboard, always centrally in front of the steering column, and manage long distances without much effort.

LIST OF REFERENCE NUMERALS 1 footboard
2 steering column
3 front wheel fork
4 front wheel
5 handlebar
6 strut
7, 7' rear wheel fork
8 wheel axle
9 rear wheel
10 semicircular slot
11, 11' wings as foot supports
12, 12' bending lines
13, 13' lateral footboard edges
14 contour of the supporting foot
15, 15', 15" contour of the pushing foot
16 footboard
17 front edge of the footboard
19 footplate
18 recess
L length of the foot plate of the footboard (1, 16)
M center line
R direction of the pushing motion
S, S' intersections
α angle between the footboard edge (13') and the center line (M)

The invention claimed is:

1. A scooter, comprising:
   a footboard near a roadway, the footboard having a front end in a direction of travel, a backend, a footplate arranged at the front end of the footboard and a footboard longitudinal axis in the direction of travel;
   a rotatable steering column with a horizontal handlebar and a steering wheel that is mounted in a fork of the steering column;
   a single wheel provided at the backend of the footboard arranged to rotate in the direction of travel and not pivot with respect to the direction of travel;
   laterally projecting wings located at the front end of the footboard that are symmetrical to the steering column,
   wherein each wing of the laterally projecting wings terminates at the front end of the footboard with a front distal edge that is perpendicular to the footboard longitudinal axis and terminates laterally with a side distal edge that is parallel to the footboard longitudinal axis;
   wherein the laterally projecting wings are configured as footrests which, with respect to a central area of the footboard, are angled upwards in such a manner so that they support the scooter when tilted in the park position and, when cornering, do not contact the roadway when in an inclined position, and
   wherein an area adjoining the wings and the footboard is tapered towards the backend of the footboard.

2. The scooter according to claim 1, wherein the wings are angled upwards at an angle of about 8° with respect to the footboard.

3. The scooter according to claim 1, wherein the footboard in its front area has a semicircular slot as a free space for the rotatable wheel.

4. The scooter according to claim 2, wherein the footboard in its rear area has a slot, in which the rotatable rear wheel mounted in a fork is arranged.

5. The scooter according to claim 1, wherein the footboard at the front end has a width of 250 mm and at its back end has a width of 100 mm.

6. The scooter according to claim 1, wherein the footboard consists of 8 mm thick duralumin.

7. The scooter according to claim 1,
wherein the wings are angled upwards at an angle of about 8° with respect to the footboard;
wherein the footboard in its front area has a semicircular slot as a free space for the rotatable wheel that is mounted in a fork of the steering column;
wherein the footboard in its rear area has a slot, in which the rotatable rear wheel mounted in a fork is arranged;
wherein the footboard at the front end has a width of 250 mm and at its back end has a width of 100 mm; and
wherein the footboard consists of 8 mm thick duralumin.

8. A scooter, comprising:
a footboard, the footboard comprising a front end in a direction of travel, a backend opposite the front end, a footplate and a footboard longitudinal axis in the direction of travel;
a rotatable steering column arranged at the front end of the footboard, the steering column comprising a horizontal handlebar and a steering wheel;
a wheel located at the backend of the footboard coupled to the footboard to rotate in the direction of travel and not pivot with respect to the direction of travel;
a pair of wings laterally projecting from the footboard, wherein wings are symmetrical to the steering column;
wherein each wing of the laterally projecting wings terminates at the front end of the footboard with a front distal edge that is perpendicular to the footboard longitudinal axis and terminates laterally with a side distal edge that is parallel to the footboard longitudinal axis;
wherein the wings, with respect to a central area of the footboard, are angled upwards to support the scooter when tilted in parked position and, when cornering, do not contact a roadway when in an inclined position, and
wherein an area adjoining the wings and the footboard is tapered backwards.

9. The scooter according to claim 8,
wherein the footboard in its front area has a semicircular slot as a free space for the rotatable wheel that is mounted in a fork of the steering column; and
wherein the footboard in its rear area has a slot, in which the rotatable rear wheel mounted in a fork is arranged.

10. The scooter according to claim 9,
wherein the wings are angled upwards at an angle of about 8° with respect to the footboard;
wherein the footboard at the front end has a width of 250 mm and at its back end has a width of 100 mm; and
wherein the footboard consists of 8 mm thick duralumin.

* * * * *